(12) United States Patent
Anslot et al.

(10) Patent No.: US 11,895,486 B2
(45) Date of Patent: Feb. 6, 2024

(54) METHOD FOR PERSONALIZING AN IMPROVED UICC COOPERATING WITH A TERMINAL

(71) Applicant: THALES DIS FRANCE SAS, Meudon (FR)

(72) Inventors: Michel Anslot, Gemenos (FR); Marc Lamberton, Gemenos (FR); PHilippe Bouckaert, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 529 days.

(21) Appl. No.: 17/269,455

(22) PCT Filed: Aug. 16, 2019

(86) PCT No.: PCT/EP2019/072049
§ 371 (c)(1),
(2) Date: Feb. 18, 2021

(87) PCT Pub. No.: WO2020/038847
PCT Pub. Date: Feb. 27, 2020

(65) Prior Publication Data
US 2021/0258781 A1    Aug. 19, 2021

(30) Foreign Application Priority Data

Aug. 23, 2018    (EP) .................................. 18306134

(51) Int. Cl.
*H04W 12/041*    (2021.01)
*H04L 9/08*    (2006.01)
(Continued)

(52) U.S. Cl.
CPC ......... *H04W 12/041* (2021.01); *H04L 9/0841* (2013.01); *H04W 8/20* (2013.01);
(Continued)

(58) Field of Classification Search
CPC ..... H04W 12/041; H04W 8/20; H04W 8/265; H04W 12/35; H04W 48/14; H04W 60/04;
(Continued)

(56) References Cited

U.S. PATENT DOCUMENTS 9,037,112 B2 *  5/2015  Rajadurai ............. H04W 12/35
                                                                  713/168
2014/0329502 A1  11/2014  Lee et al.
(Continued)

FOREIGN PATENT DOCUMENTS

| EP | 3358868 A1 | 8/2018 |
|---|---|---|
| EP | 3358869 A1 | 8/2018 |
| WO | 2012035850 A1 | 3/2012 |

OTHER PUBLICATIONS

International Search Report and Written Opinion dated Oct. 2, 2019 for corresponding international Patent Application No. PCT/EP2019/072049, filed Aug. 16, 2019.
(Continued)

*Primary Examiner* — Amie C. Lin

(57) ABSTRACT

A method for personalizing a UICC includes: i—sending from the UICC to a D-HSS an attach request message comprising an IMSI with a given MCC/MNC; ii—sending from the D-HSS to the UICC a command and first cryptographic data; iii—computing at the UICC a secret key by using the first cryptographic data; iv—sending from the UICC to the D-HSS a command and second cryptographic data; v—repeating steps ii to iv until the UICC holds the entire first cryptographic data and the D-HSS holds the entire second cryptographic data; vi—computing at the D-HSS the secret key by using the second entire cryptographic data; vii—allocating by the D-HSS a free IMSI belonging to an operator and transferring from the D-HSS to the UICC the free IMSI and other personalization data;
(Continued)

viii—personalizing the UICC with the free IMSI, personalization data and the secret key.

7 Claims, 8 Drawing Sheets

(51) Int. Cl.
*H04W 8/20* (2009.01)
*H04W 8/26* (2009.01)
*H04W 12/30* (2021.01)
*H04W 48/14* (2009.01)
*H04W 60/04* (2009.01)

(52) U.S. Cl.
CPC .......... *H04W 8/265* (2013.01); *H04W 12/35* (2021.01); *H04W 48/14* (2013.01); *H04W 60/04* (2013.01)

(58) Field of Classification Search
CPC ..... H04W 8/205; H04W 12/06; H04W 12/40; H04W 8/00; H04L 9/0841
See application file for complete search history.

(56) References Cited

U.S. PATENT DOCUMENTS

| | | | |
|---|---|---|---|
| 2015/0163056 A1* | 6/2015 | Nix | H04W 12/35 380/46 |
| 2015/0181024 A1* | 6/2015 | El Mghazli | H04W 12/35 455/411 |
| 2015/0359026 A1 | 12/2015 | Iwai et al. | |
| 2016/0021527 A1* | 1/2016 | El Mghazli | H04W 12/04 455/435.1 |
| 2021/0176620 A1* | 6/2021 | Hallman | H04W 4/025 |

OTHER PUBLICATIONS

"3rd Generation Partnership Project; Technical Specification Group Services and System Aspects; Study on the security aspects of the next generation system (Release 14)", Jun. 21, 2017.
Vodafone: "pCR to TR 33.834—Updates to clauses 1 to 8 to prepare for approval", 3GPP Draft; S3-180843 PCR to TR 33.834—Updates to Clauses 1 to 8 to Prepare for Approval, 3rd Generation Partnership Project (3GPP), Mar. 2, 2018.

* cited by examiner

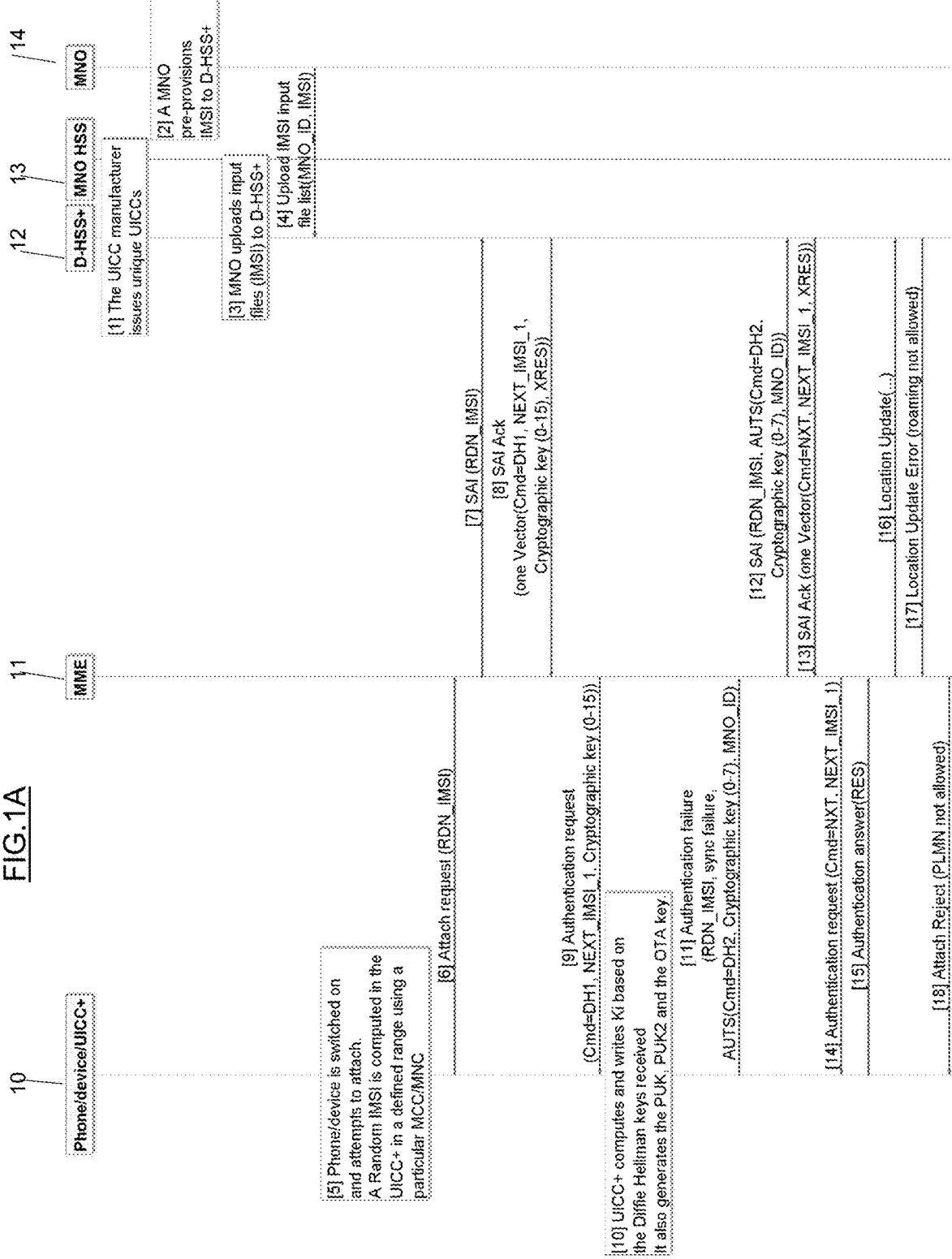

FIG.1B

10 Phone/device/UICC+ — 11 MME — 12 D-HSS+

[19] UICC+ sets the IMSI value to NEXT_IMSI_1 value and sends REFRESH

[20] Refresh proactive command

[21] Attach request (NEXT_IMSI_1)

[22] SAI (NEXT_IMSI_1)

[23] SAI Ack (one Vector(Cmd=NXT, Next_IMSI_2, XRES))

[24] Authentication request (Cmd=NXT, Next_IMSI_2)

[25] Authentication failure (NEXT_IMSI_1, sync failure, AUTS(Cmd=DH3, Cryptographic key (8-15)))

[26] SAI (NEXT_IMSI_1, AUTS(Cmd=DH3, Cryptographic key (8-15)))

[27] DHSS+ computes Ki based on the Diffie-Hellman keys exchanged. It also generates the PUK, PUK2 and the OTA key.

[28] SAI Ack (one Vector(Cmd=NXT, NEXT_IMSI_2, XRES))

[29] Authentication request (Cmd=NXT, NEXT_IMSI_2)

[30] Authentication answer(RES)

[31] Location Update(...)

[32] Location Update Error (roaming not allowed)

[33] Attach Reject (PLMN not allowed)

[34] UICC+ sets the IMSI value to NEXT_IMSI_2 value and sends REFRESH

[35] Refresh proactive command

[36] Attach request (NEXT_IMSI_2)

[37] SAI (NEXT_IMSI_2)

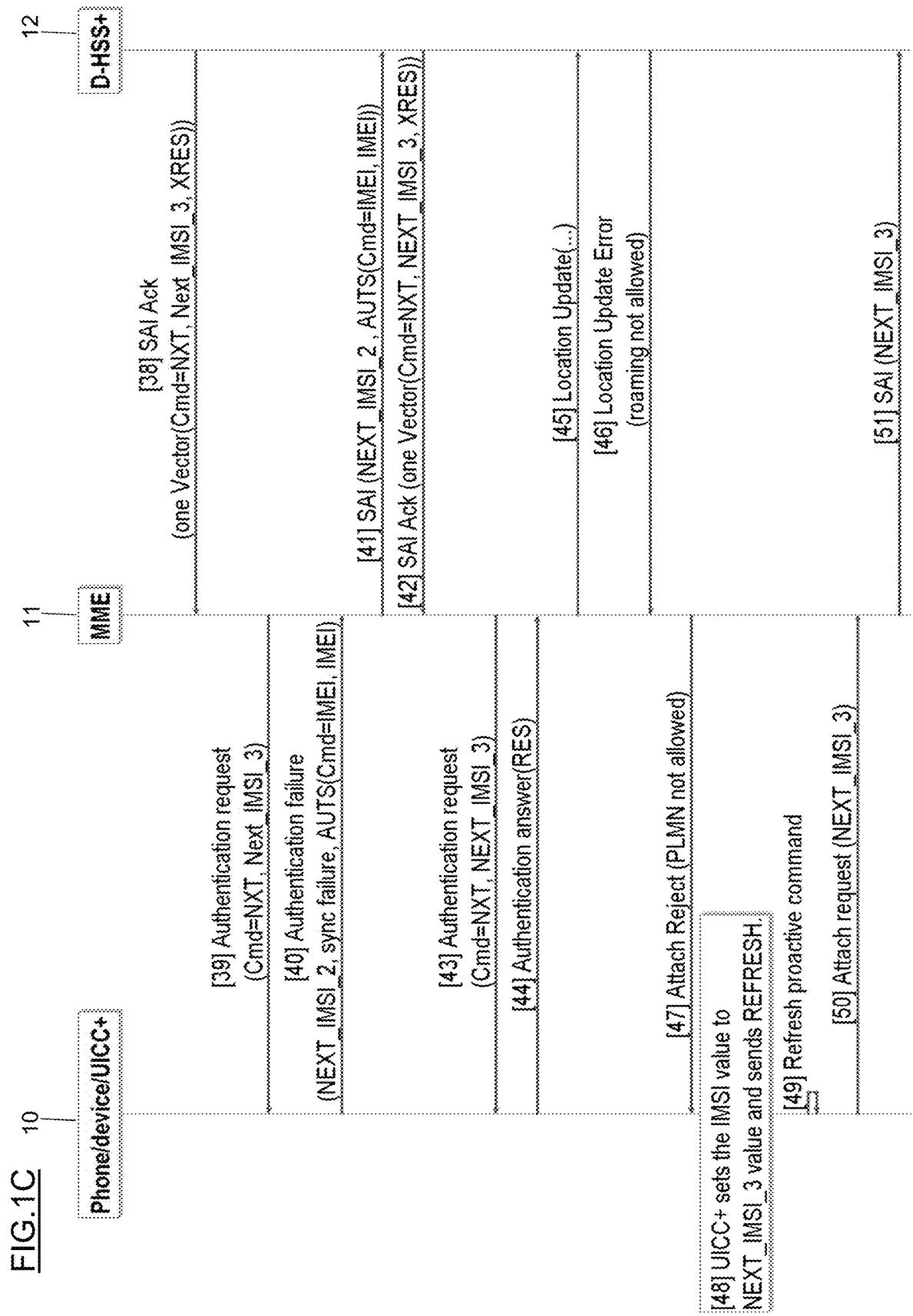

FIG. 2B

Phone/device/UICC+ (10) — MME (11) — D-HSS+ (12)

[69] UICC+ sets the Next_IMSI_4 + "NET" value and sends REFRESH

[70] Attach request (Next_IMSI_4)

[71] SAI (Next_IMSI 4)

[72] SAI Ack (one Vector/Cmd = "Give operator name", NEXT_IMSI 5, XRES)

[73] Authentication request (Cmd = "Give operator name", NEXT_IMSI 5)

[74] Authentication failure (NEXT_IMSI 5, sync failure, AUTS(CMD ="Give operator name", "NET"))

[75] SAI (NEXT_IMSI 5, AUTS (CMD ="Give operator name," "NET")

[76] D-HSS+ identifies an operator based on name provided "NET" and the originating country where the device switches on. D-HSS+ assigns the MNO IMSI based on "NET" rules

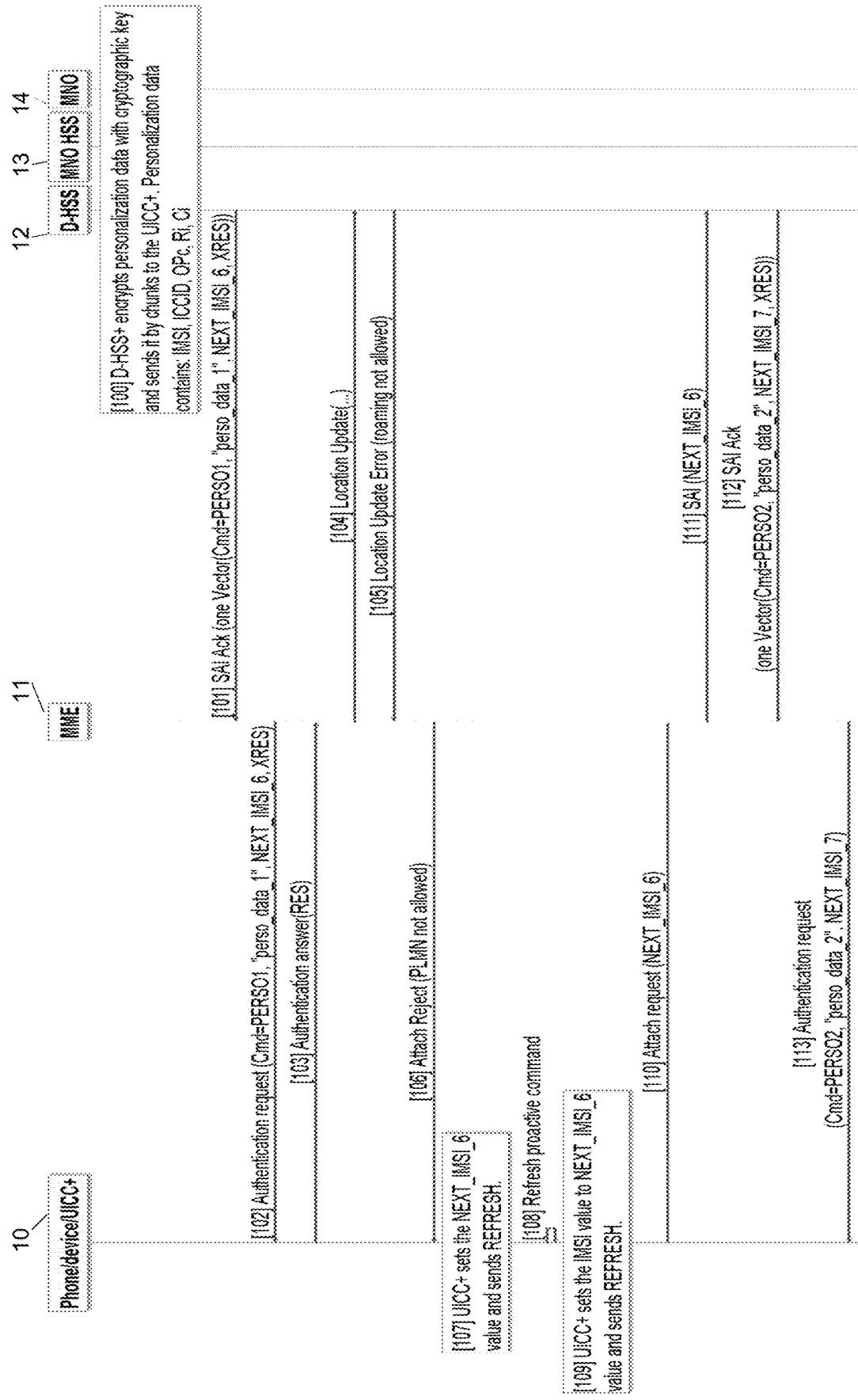

METHOD FOR PERSONALIZING AN IMPROVED UICC COOPERATING WITH A TERMINAL

The present application concerns telecommunications and is linked to EP 17305204.4 which is here entirely integrated.

The present invention concerns in particular the personalization and/or diversification of improved UICCs (Universal Integrated Circuit Cards) over the air.

Personalization consists in installing in a UICC cooperating with a telecommunication terminal a profile of a MNO (Mobile Network Operator) while diversification consists in installing in a UICC of a given MNO parameters allowing the UICC to connect to its MNO, these parameters being for example an IMSI (International Mobile Subscriber Identity), a Ki (a cyphering key), an ICCID (Integrated Circuit Card ID), and a profile containing parameters for an authentication algorithm (e.g. OPc, Ri, Ci for the Milenage algorithm) over the air.

The present invention proposes a procedure to personalize and diversify over-the-air a "Universal UICC" manufactured with a generic non-diversified profile. This operation is performed over the signaling channel (SS7 or MAP) and optimizes the manufacturing process and costs and does not incur any data roaming costs.

It applies to 2G to 5G networks and is compatible with the 3GPP standards.

It is known that a UICC provides secure, identifiable and authenticated access to mobile networks. Since its inception in the early 1990's to the present day, the UICC (e.g. a SIM card) provides secure, identifiable and authenticated access to mobile networks. It is also the primary piece of operator supplied equipment used by consumers when connecting to the mobile network.

The SIM will continue to provide secure access to mobile operator networks.

Today, all the personalization and diversification of the UICC is performed in factory leading incurring manufacturing costs and complexity: All the UICC orders from operators also require to securely exchange input and output files containing the main UICC parameters: ICCID, IMSI, Ki, OTA key, PUK keys, OPC, Ri, Ci, . . . .

Moreover, being personalized and diversified, the produced UICCs have a limited validity period (typically from 3 to 12 months). After expiration of unsold UICCs, the MNO must free resources from its network and IT systems. This generates costs for the MNO to de-provision and destroy these expired UICCs.

The invention aims to perform the UICC personalization and diversification dynamically when it is used the first time.

It is known from European patent application EP-17305203 (incorporated herein by reference) that a bidirectional communication channel can be established between a server and a secure element cooperating with a terminal in a cellular telecommunication network for exchanging data and commands. In this patent application, it is described that this bidirectional communication channel can be established by:

Sending a first attachment request signaling message from the terminal to the server, the first message comprising a MCC and a MNC of the server, and at least a part of a unique identifier of the secure element, the server being provisioned with the unique identifier;

Sending from the server to the secure element, in at least a first signaling message:
At least a command;
A correlation identifier if further messages have to be sent from the secure element to the server;
A first payload comprising data;
Executing at the secure element the command.

Briefly said, this application proposes to use the signaling channel (MAP or SS7) to exchange data and commands between the secure element (UICC) and an element of the network (an improved HSS also called D-HSS+).

The present invention proposes to use such a mechanism in order to exchange data between an improved UICC and an improved HSS in order to personalize and/or diversify a UICC over the signaling channel.

This purpose is reached thanks to a method for personalizing an improved UICC cooperating with a terminal, the method comprising:

i—Sending from the improved UICC to an improved D-HSS an attach request message comprising an IMSI with a given MCC/MNC;

ii—Sending from the improved D-HSS to the improved UICC at least a command and a first cryptographic data;

iii—Computing at the improved UICC a secret key by using the first cryptographic data;

iv—Sending from the improved UICC to the improved D-HSS in at least one Authentication failure message a command and a second cryptographic data or a part of it;

v—Repeating steps ii to iv until the UICC holds the entire first cryptographic data and the improved D-HSS holds the entire second cryptographic data;

vi—When the improved D-HSS holds the entire second cryptographic data, computing at the improved D-HSS the same secret key by using the second entire cryptographic data;

vii—Allocating by the improved D-HSS a free IMSI belonging to an operator and transferring from the improved D-HSS to the improved UICC the free IMSI and other personalization data viii—Personalizing the improved UICC with the free IMSI, personalization data and the secret key.

Preferably, the personalization data is encrypted with the secret key and then transferred from the improved D-HSS to the improved UICC.

Advantageously, the first and second cryptographic keys are Diffie-Hellman exchanged numbers, the first cryptographic data being $A=g^a$ mod p and the second cryptographic data being $B=g^b$ mod p, where p and g are pre-agreed numbers by the improved D-HSS and the improved UICC, "a" being a random number selected by the improved D-HSS and "b" being a random number selected by the improved UICC.

Preferably, the improved UICC sends in an Authentication message request the NEI of the terminal with which it cooperates and the improved D-HSS uses that IMEI to select an MNO for the user of the terminal.

Advantageously, the improved D-HSS sends a command to the improved UICC in a SAI Ack message in order to prompt the user to enter the name of a MNO.

Advantageously, the improved D-HSS personalizes the improved UICC by sending subscription data for the selected MNO to the improved UICC, the subscription data containing an IMSI, an ICCID, an OPc, a Ri and a Ci sent in multiple SAI Ack messages comprising commands.

Preferably, each of the multiple SAI Ack messages comprise different IMSIs used for correlating the dialogue between the improved D-HSS and the improved UICC.

Advantageously, once the improved UICC is personalized, the improved D-HSS provisions the selected MNO network with the IMSI/Ki in order to allow the improved UICC to communicate with the selected MNO network.

The invention also concerns an improved UICC arranged for implementing this method and an improved D-HSS arranged for implementing this method.

The invention will be better understood at the reading of the following description of the figures that represent a complete set of exchanges permitting to personalize or diversify a UICC+ (a special UICC) according to the invention. More precisely:

FIGS. 1A, 1B and 1C represent preliminary different steps permitting to establish a secure channel between a terminal comprising an improved secure element (UICC+) according to the invention and an improved D-HSS;

FIGS. 2A and 2B represent three options for assigning an IMSI to a UICC+ at the level of a D-HSS+;

FIG. 3A to 3C represent the personalization steps of a UICC+ according to the invention.

Figure 2A:
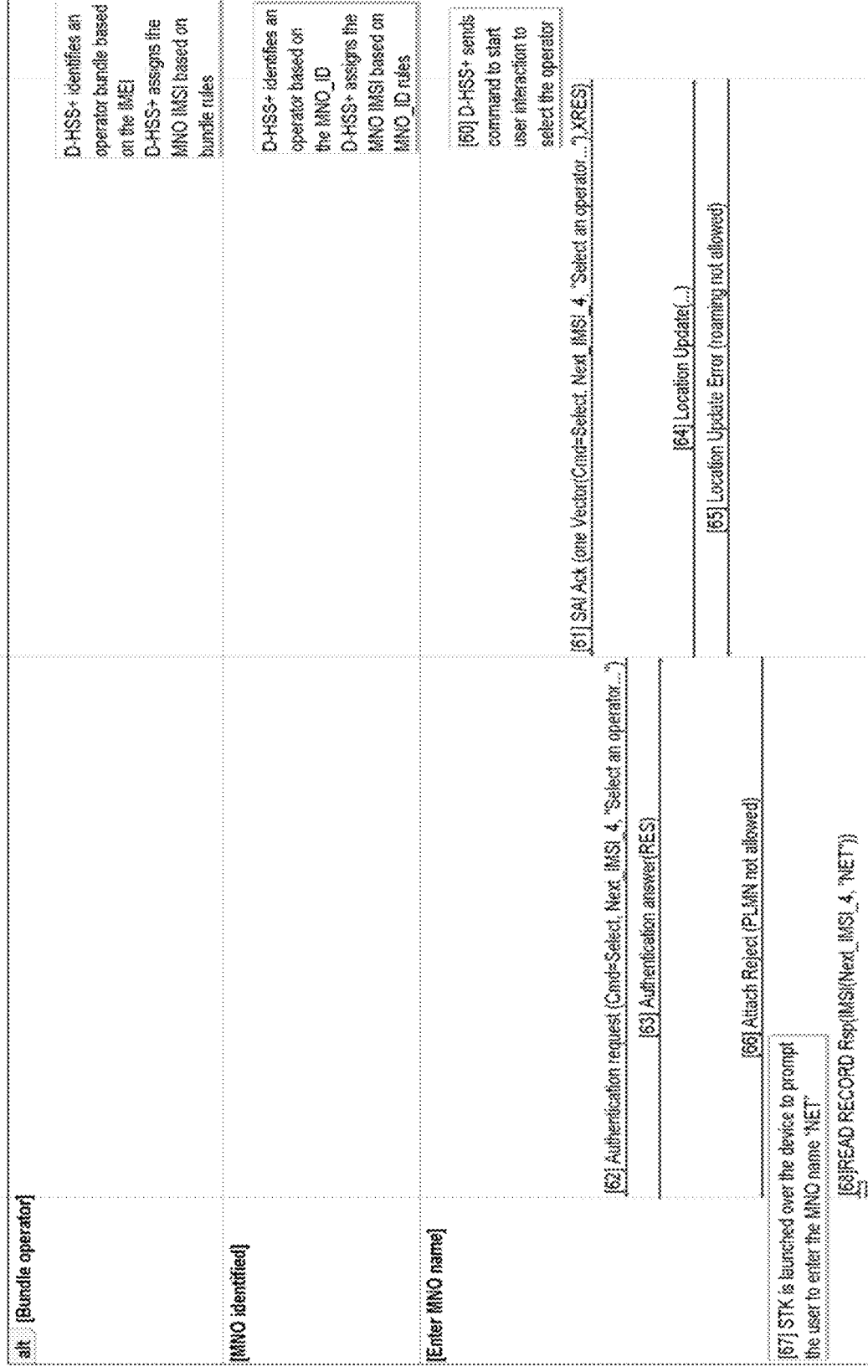

The purpose of the invention is to personalize or diversify a UICC+ by using only the MAP (Mobile Application Part) exchanges which is an application layer protocol used by various elements in GSM, UMTS, and GPRS mobile core networks to provide services to mobile phone (terminals) users. MAP can be transported using 'traditional' SS7 protocols in TDM (T1 and E1) or over IP using SIGTRAN.

FIG. 1A represents preliminary different steps (1 to 18) permitting to establish a secure channel between a terminal 10 comprising an improved secure element (UICC+) according to the invention and an improved D-HSS 12 (called D-HSS+).

Some other actors are represented: A MME (Mobility Management Entity) 11, a HSS 13 of a MNO and a MNO 14.

At step 1, a UICC manufacturer issues unique UICCs.

By "unique", it is meant that all the issued UICCs are strictly identical or can be issued with a given MNO_ID. They are not provisioned by any subscription.

At steps 2 and 3, the MNO 14 pre-provisions a plurality of IMSIs and sends them to the D-HSS+12. The D-HSS+ 12 will use these IMSI when a subscriber selects the MNO.

At step 3, the MNO uploads input files (IMSIs) to the D-HSS+ 12. The D-HSS+ 12 is therefore provisioned with these IMSIs.

At step 4, the MNO 14 uploads an IMSI input file list to the D-HSS+ 12. This list contains the MNO_ID and the corresponding IMSIs. The D-HSS+ 12 is configured with the list of MNO_ID, allowing to identify the MNO. This MNO_ID is either directly retrieved in the IMSI (first case, bundle operator), or is configured in the UICC (second case, MNO identified), or is selected by the user (third case). These three cases will be detailed hereafter.

At step 5, the user of the terminal 10 switches on his terminal that tries to attach to a telecommunication network. For that, a random IMSI (RDN_IMSI) is chosen in the UICC+ in a defined list or range (for example one IMSI among 20.000). This list or range of IMSI are stored in the UICC+ at the level of its manufacturing. The MCC/MNC codes of this IMSI are those of the D-HSS+ 12 with which the UICC+ will in the preliminary steps communicate.

At step 6, the terminal 10 sends an Attach request message to the MME 11 comprising the IMSI randomly chosen in the defined range or list. The MME then forwards this request (step 7) in a SAI message (SEND_AUTHENTICATION_INFO) to the D-HSS+ 12.

At step 8, the D-HSS+ 12 answers to this request with a SAI Ack message containing one vector composed of:
- A command (here DH1 for Diffie-Hellman 1)
- An IMSI (here called NEXT_IMSI_1)
- A Diffie-Hellman key (16 bytes, from 0 to 15), this key constituting a first cryptographic data
- A XRES value The MME 11 forwards the command DH1, the NEXT_IMSI_1 and the cryptographic key to the UICC+ 10 in an authentication request parameter (AUTN). An AUTN parameter permits to send 15 bytes.

At step 10, the UICC+ computes a secret key Ki based on the Diffie-Hellman key received and stores this secret key Ki. It also generates thanks to this key a PUK code, a PUK2 code and an OTA key.

At step 11, the UICC+ 10 sends an Authentication failure message to the MME 11 containing:
- The RDN_IMSI
- A synchronization failure message
- A resynchronization token AUTS comprising a command (here DH2), the eight first bytes of a second cryptographic data (the total length of the cryptographic key is 16 bytes), and a MNO_ID if such an ID is available. As it be explained later, the method of the invention permits to personalize and diversify UICC+. A personalization has to be done if the name of a MNO is already stored in the UICC+(a bundle of UICC+ are manufactured for a given operator). A diversification can take place when no MNO name is present in the manufactured UICC+ 10.

The MME then sends to the D-HSS+ (step 12), in a SAI message, the RDN_IMSI, and the AUTS token.

At step 13, the D-HSS+ 12 sends to the MME 11 another SAI message containing one vector comprising a command (NXT for "next"), NEXT_IMSI_1 and another XRES value.

The command and the NEXT_IMSI_1 are then forwarded by the MME 11 to the UICC+ 10 in an Authentication request message.

At step 15, the UICC+ 10 answers with a RES and the MME sends (at step 16) a location update message to the D-HSS+ 12.

At step 17, the D-HSS+ 12 answers with a Location Update Error message (roaming not allowed) since only the eight first bytes of the cryptographic key of the UICC+ have been sent to the D-HSS+ 12 and the end of the Diffie-Hellman process needs the 16 bytes of this key.

At step 18, the MME 11 sends an Attach Reject message to the UICC+ (PLMN not allowed). FIG. 1B shows the next steps, step 19 following step 18.

At step 19, the UICC+ 10 sets the IMSI value to NEXT_IMSI_1 and sends a Refresh command to the terminal. The later executes the refresh at step 20.

At step 21, the UICC+ 10 sends an Attach request message to the MME 11 containing NEXT_IMSI_1 and the MME 11 sends to the D-HSS+ 12 this IMSI in a SAI message (step 22).

At step 23, the D-HSS+ 12 sends to the MME 11 in a SAI Ack message a vector containing a command NXT (next), a new IMSI (NEXT_IMSI_2) and a XRES. The new IMSI (NEXT_IMSI_2) is used in order that the MME does not receive twice the same IMSI. This is true for the following description. The MME 11 forwards the command and the new IMSI in an Authentication Request message to the UICC+(step 24).

The NXT command is interpreted by the UICC+ 10 as a request for sending the remaining part of the second 16 bytes cryptographic data. It sends then (step 25) an Authentication Failure message containing NEXT_IMSI_1, a sync failure (a status of the Authentication Failure message), and an AUTS comprising a command (DH3) and the last eight bytes (8 to 15) of the cryptographic key. At step 26, the MME forwards the NEXT_IMSI_1 and the AUTS to the D-HSS+ 12 in a SAI message.

The D-HSS+ 12 then computes the key Ki based on the exchanged Diffie-Hellman keys. It also generates the PUK, PUK2 and the OTA key (step 27). This is the end of the Diffie-Hellman exchange, the UICC+ 10 and the D-HSS+ 12 having the necessary keys for exchanging secrets.

The establishment of a secure channel is in this example based on a Diffie-Hellman protocol. Some other protocols are of course possible for establishing a secure channel, like for example by using symmetric keys (SCP03 for example) or asymmetric keys (SCP11 for example). It is also possible to derive a key by using the random IMSI (or a part of it) selected by the UICC+(this key is computed in the UICC+ and, after transmission of the random IMSI to the D-HSS+ 12, computed in this D-HSS+ 12 by using the entire IMSI (MSIN in fact) or a part of it).

Then, the procedure continues with steps similar to steps 13 to 26 in order to retrieve the IMEI of the terminal 10 (the terminal can be a subsidized terminal pertaining to a bundle): At step 28, the D-HSS+ 12 sends to the MME 11 in a SAI Ack message one vector comprising the command NEXT, NEXT_IMSI_2 and XRES. The MME forwards (step 29) the command NEXT and NEXT_IMSI_2 to the UICC+ in an Authentication request message.

At step 30, the UICC+ 10 answers to the MME 11 with a RES comprised in a Authentication answer message and the MME 11 sends a Location Update message to the D-HSS+ 12 (step 31).

At step 32, the D-HSS+ 12 answers with a Location Update Error message (roaming not allowed).

At step 33, the MME 11 sends an Attach Reject message to the UICC+(PLMN not allowed).

At step 34, the UICC+ 10 sets the IMSI value to NEXT_IMSI_2 and sends a Refresh command to the terminal. The latter executes the refresh at step 35.

At step 36, the UICC+ 10 sends an Attach request message to the MME 11 containing NEXT_IMSI_2 and the MME 11 sends to the D-HSS+ 12 this IMSI in a SAI message (step 37).

FIG. 10 shows the next steps, step 38 following step 37.

At step 38, the D-HSS+ 12 sends to the MME 11 in a SAI Ack message a vector containing a command NXT (next), a new IMSI (NEXT_IMSI_3) and a XRES. The new IMSI (NEXT_IMSI_3) is used in order that the MME does not receive twice the same IMSI. All of these IMSI (NEXT_IMSI_X) are temporary IMSIs. The MME 11 forwards the command and the new IMSI in an Authentication Request message to the UICC+ (step 39).

The NXT command is interpreted by the UICC+ as a request for sending the IMEI of the terminal with which it cooperates. It sends then (step 40) an Authentication Failure message containing NEXT_IMSI_2, a sync failure message, and an AUTS comprising a command (IMEI) and the IMEI of the terminal. At step 41, the MME forwards the NEXT_IMSI_2 and the AUTS to the D-HSS+ 12 in a SAI message.

Steps 42 to 51 are identical to steps 28 to 37, with NEXT_IMSI_2 being replaced by NEXT_IMSI_3.

After these different steps, different possibilities exist. These are represented in FIGS. 2A and 2B.

For the first case (Bundle operator), the terminal pertains to a bundle operator (the MNO has decided to sell his terminals at a low cost), the D-HSS+ 12 identifies this MNO thanks to the IMEI sent by the UICC+ 10 (steps 40 and 41) and assigns the MNO IMSI based on bundle rules.

For the second case (MNO identified), the different UICC+ are not diversified (they belong to a given operator). In this case, the D-HSS+ 12 identifies an operator based on the MNO_ID (steps 11 and 12) and assigns the MNO IMSI based on the MNO rules.

For the third case, all UICC+ are strictly identical and the user can choose his operator. In this case, after step 51 of FIG. 10, the method continues with step 60 of FIG. 2A.

Step 60 consists in initiating in the D-HSS+ 12 the sending of a message allowing the user of the terminal to choose his operator (MNO). At step 61, a SAI Ack message containing one vector comprising a command (Select), Next_IMSI_4, and a message "select an operator" is sent to the MME 11, along with a XRES.

The MME 11 then transmits (step 62) to the UICC+ an Authentication Request message containing this vector (Cmd=Select, Next_IMSI_4, "Select an operator . . . ").

The UICC+ 10 answers with a RES (step 63—Authentication answer) that is modified by the MME 11 in a location update message (step 64) transmitted to the D-HSS+ 12.

The D-HSS+ 12 answers with a Location Update Error message (Roaming not allowed—step 65) and the MME 11 transmits to the UICC+ 10 (step 66) an Attach reject message (PLMN not allowed).

At step 67, a STK (Sim Tool Kit) applet is launched over the terminal to prompt the user of this terminal to enter the name of a MNO, for example in abbreviated form (NET).

After a Read Record command (step 68) launched by the terminal (Read Record Rsp (IMSI(NEXT_IMSI_4), "NET")), the UICC+ 10 sets the NEXT_IMSI_4 and NET value and sends a refresh command to the device—like step 48—(step 69).

At step 70, the UICC+ 10 sends an Attach Request message to the MME 11 containing NEXT_IMSI_4.

At step 71, the MME sends the Next_IMSI_4 in a SAI message to the D-HSS+. The latter answers with a SAI-Ack (one vector(Cmd=Give operator name", NEXT_IMSI_5, XRES) message to the MME (step 72) and the MME sends an Authentication request (Cmd="Give operator name", NEXT_IMSI_5) to the UICC+(step 73).

The command "Give operator name" requests to the user to enter the name of an operator (MNO).

At step 74, the UICC+ sends a Authentication_failure message containing NEXT_IMSI_5, sync_failure, and a AUTS comprising the command "Give operator name" and the name of the operator ("NET") to the MME. The user has previously enter red the name "NET" through the user interface of his terminal.

The ME 11 then (step 75) sends to the D-HSS+ 12 in a SAI message, NEXT_IMSI_5 and an AUTS containing the command "give operator name", and the name of the MNO ("NET"). At step 76, the D-HSS+ 12 identifies an operator based on the name "NET" and the originating country where the terminal has been switched on. The D-HSS+ 12 assigns the MNO IMSI based on "NET" rules. These rules are provisioned in the D-HSS+, the originating country is obtained by the signaling channel and the D-HSS+ has a table associating a MNO to the couple "originating country"/"NET".

For the cases «Bundle operator» and «MNO identified», steps 60 to 76 are not implemented.

For all the three cases, the following procedure will follow (step 100 of FIG. 3A).

Figure 3B:
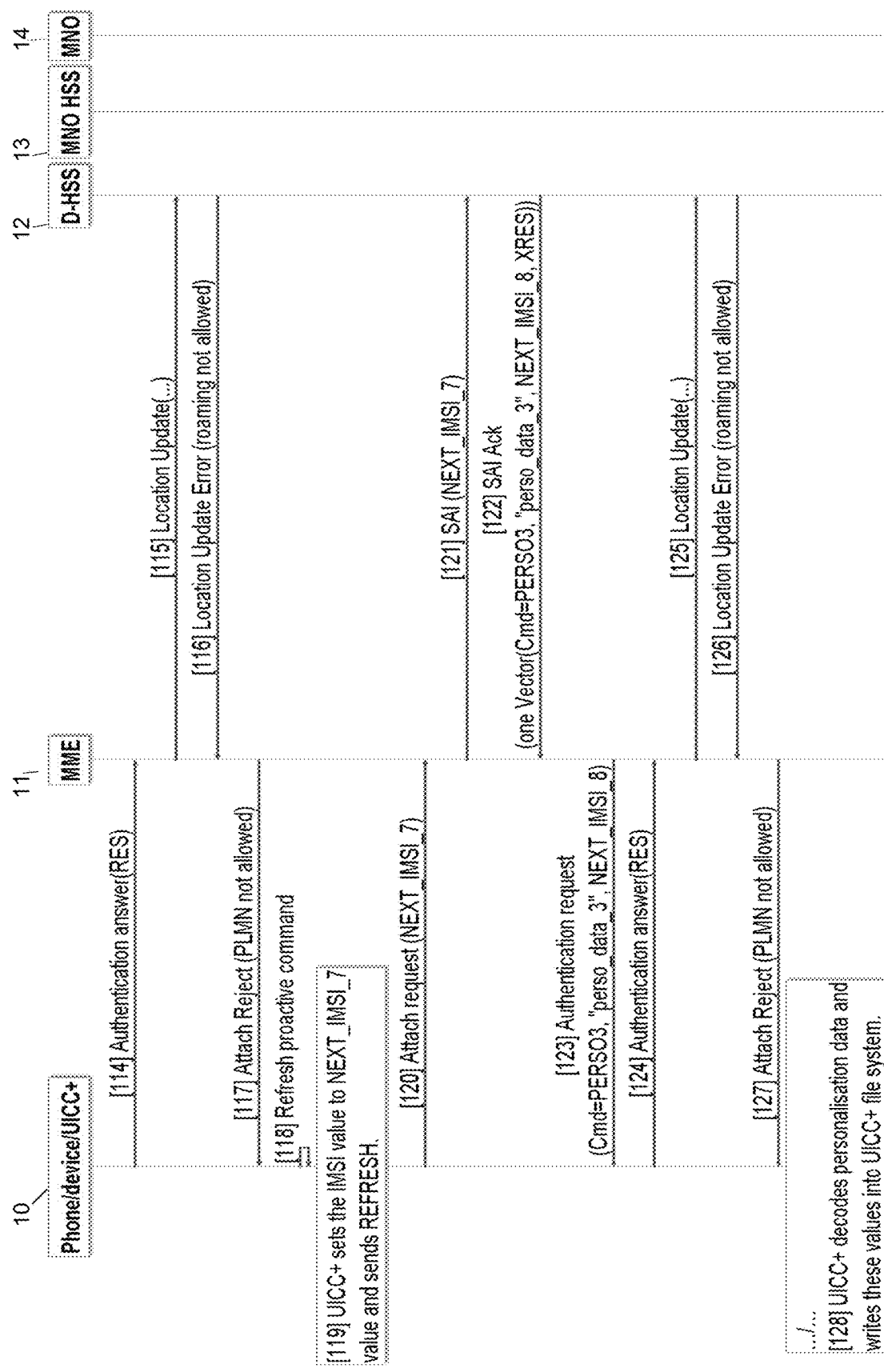
Figure 3C:
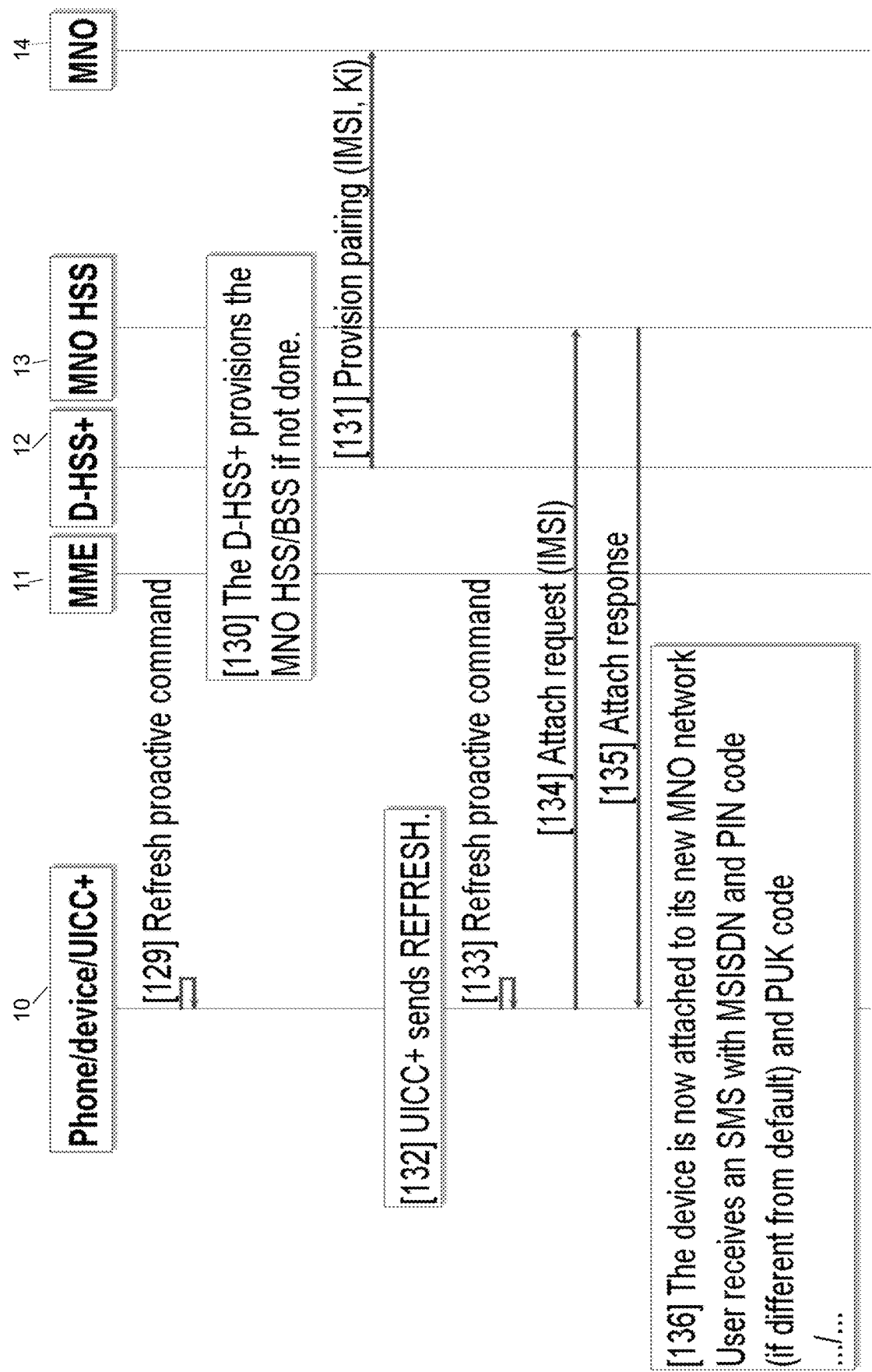

FIG. 3A to 3C represent the personalization steps of a UICC+ according to the invention. These steps are common to the three cases presented in FIGS. 2A and 2B.

The first step (100) consists in encrypting with the cryptographic key, at the level of the D-HSS+ 12, personalization data that will be transmitted by chunks to the UICC+. These personalization data contain an IMSI, a ICCID, a OPc, a Ri and a Ci.

It is here assumed that three chunks are necessary to transmit these personalization data to the UICC+ 10.

At step 101, the D-HSS+ 12 sends to the MME 11 in a SAI Ack message one vector comprising a command "PERSO1", first personalization data "perso_data_1", a new IMSI (NEXT_IMSI_6) and a XRES.

The MME 11 sends to the UICC+ 10 this vector (step 102—in a Authentication request message) and the later answers to the MME 11 with an Authentication answer (RES—step 103). The MME 11 then sends to the D-HSS+ 12 (step 104) a location update message to which the D-HSS+ 12 answers with a Location Update Error message (Roaming not allowed—step 105). The MME 11 then informs the UICC+ 10 (step 106) that the attachment has been rejected (Attach Reject (PLMN not allowed)).

At step 107, the UICC+ 10 sets the IMSI value to NEXT_IMSI_6 value and sends a Refresh message. The terminal then sends (step 110) an Attach Request message containing NEXT_IMSI_6 to the MME 11 and the later transmits to the D-HSS+ 12 this IMSI to the D-HSS+ 12 in a SAI message (step 111).

Steps 112 to 121 are the same as steps 114 to 121, the command PERSO1 being replaced by PERSO2 and perso_data_1 being replaced by other personalization data perso_data_2. Another IMSI (NEXT_IMSI_7) is used for these steps.

At step 122, the same message format is used by the D-HSS+ 12 with a command PERSO3, a NEXT_IMSI_8 and perso_data_3. Steps 122 to 127 are identical to steps 112 to 117. Next_IMSI_8 is the IMSI of the MNO.

After steps 122 to 127, it is assumed that all personalization data have been received by the UICC+ 10 and, at step 128, the UICC+ 10 decodes all the personalization data and writes them in his file system.

The UICC+ 10 is now fully personalized.

After a Refresh proactive command (step 129), the D-HSS+ 12 provisions the MNO HSS/BSS if it has not already be done (step 130).

At step 131, the D-HSS+ 12 provisions the MNO with the pair IMSI/Ki. After that the UICC+ sends a Refresh command to the terminal (step 132), this command is executed (step 133) and the UICC+ can now send an Attach Request message (step 134) to the MNO HSS 13, this Attach Request message containing the IMSI. Since this HSS 13 has been provisioned with the IMSI/Ki at step 130, the MNO HSS 13 can (step 135) send an Attach response to the UICC+ and (at step 136), the terminal/UICC+ is now attached to its new MNO network. The user can then receive from his MNO a SMS containing a MSISDN, a PIN code (if different from a default PIN code like 0000) and a PUK code.

In summary, the invention allows to create a dialog between a terminal and a discovery server D-HSS+ without being attached to a cellular network, with the objective to personalize remotely the universal UICC+ with the credentials of the targeted operator network among hundreds of network operators. The invention uses a non-diversified UICC+, the universal UICC+ produced being unique with the same default profile for all operators.

The invention is designed for 2G, 3G and 4G/LTE networks without standard modifications. The invention would be also suitable for 5G networks.

The dialog between the D-HSS+ and the UICC+ uses the three authentication messages exchanged during the device attachment. The send authentication info message sends the IMSI of the universal profile (or a part of it). The send authentication info response includes RAND, AUTN parameters and a synchro error is used to send back to the D-HSS+ data in the AUTS parameter. These four parameters are used to exchange data and execute commands between the UICC+ and the D-HSS+ service.

This enhanced attachment phase can use a worldwide root D-HSS+ containing a Discovery HLR/HSS (D-HSS+) to configure the UICC+ in order to attach to the targeted/pending operator network. This enhanced authentication phase does not attach the device to the root D-HSS+ network. Only the first messages (Send Authentication Info) are exchanged over the Discovery HLR/HSS (D-HSS+). This mechanism is not charged over the operator networks and no chargeable data are exchanged. During the enhanced authentication dialog between the UICC+ and the Discovery HLR/HSS (D-HSS+), the D-HSS+ can configure remotely the UICC+ through commands and cryptographic keys exchanged in the RAND, AUTN and AUTS parameters to personalize the UICC+ with ICCID, IMSI, Ki, OTA keys, PUK, PUK2, PIN, PIN2, OPC, Ri and Ci and/or to retrieve the IMEI and/or the MNO_ID (in case of cards produced with a logo of a MNO for example).

The invention claimed is:

1. Method for personalizing an improved Universal Integrated Circuit Card (UICC) cooperating with a terminal, said method comprising:
    i—Sending from said improved UICC to an improved Home Subscriber Server (D-HSS) an attach request message comprising an International Mobile Subscriber Identity (IMSI) with a given Mobile Country Code (MCC) and Mobile Network Code (MNC);
    ii—Sending from said improved D-HSS to said improved UICC at least a command and a first cryptographic data;
    iii—Computing at said improved UICC a secret key by using said first cryptographic data;
    iv—Sending from said improved UICC to said improved D-HSS in at least one Authentication failure message a command and a second cryptographic data;
    v—Repeating steps ii to iv until said improved UICC holds the entire first cryptographic data and said improved D-HSS holds the entire second cryptographic data;
    vi—When said improved D-HSS holds the entire second cryptographic data, computing at said improved D-HSS the same secret key by using said second entire cryptographic data;
    vii—Allocating by said improved D-HSS a free IMSI belonging to an operator and transferring from said improved D-HSS to said improved UICC said free IMSI and personalization data; and
    viii—Personalizing said improved UICC with said free IMSI, personalization data and said secret key, wherein said improved UICC sends in an Authentication message request an International Mobile Equipment Identity (IMEI) of said terminal with which it cooperates and said improved D-HSS uses the IMEI of said terminal to select a Mobile Network Operator (MNO) for the user of said terminal.

2. Method according to claim 1, wherein said personalization data is encrypted with said secret key and then transferred from said improved D-HSS to said improved UICC.

3. Method according to claim 2, wherein said first and second cryptographic data are Diffie-Hellman exchanged numbers, said first cryptographic data being $A=g^a \bmod p$ and said second cryptographic data being $B=g^b \bmod p$, where p and g are pre-agreed numbers by said improved D-HSS and said improved UICC, "a" being a random number selected by said improved D-HSS and "b" being a random number selected by said improved UICC.

4. Method according to claim 1, wherein said improved D-HSS sends a command to said improved UICC in an acknowledgement (SAI Ack) message in order to prompt a user to enter the name of an MNO.

5. Method according to claim 1, wherein said improved D-HSS personalizes said improved UICC by sending subscription data for the selected MNO to said improved UICC, said subscription data containing a specific IMSI, an Integrated Circuit Card Identification (ICCID), an OPc, a Ri and a Ci sent in multiple SAI Ack messages comprising commands.

6. Method according to claim 5, wherein each of said multiple SAI Ack messages comprise different IMSIs used for correlating the dialogue between said improved D-HSS and said improved UICC.

7. Method according to claim 5, wherein, once said improved UICC is personalized by the sending of the subscription data, said improved D-HSS provisions the selected MNO with said specific IMSI in order to allow said improved UICC to communicate with said selected MNO.

* * * * *